United States Patent Office 3,343,889
Patented Sept. 26, 1967

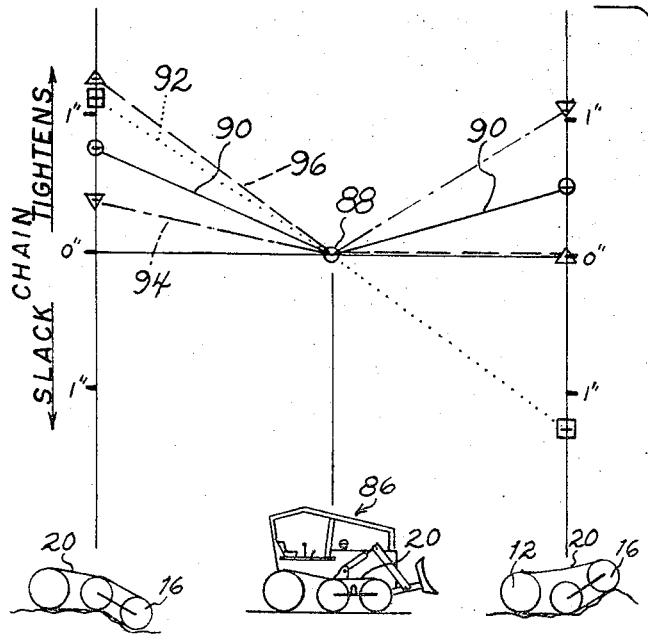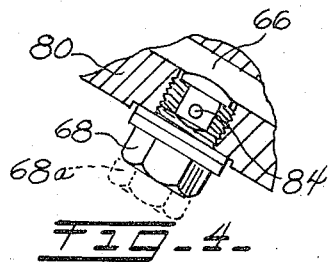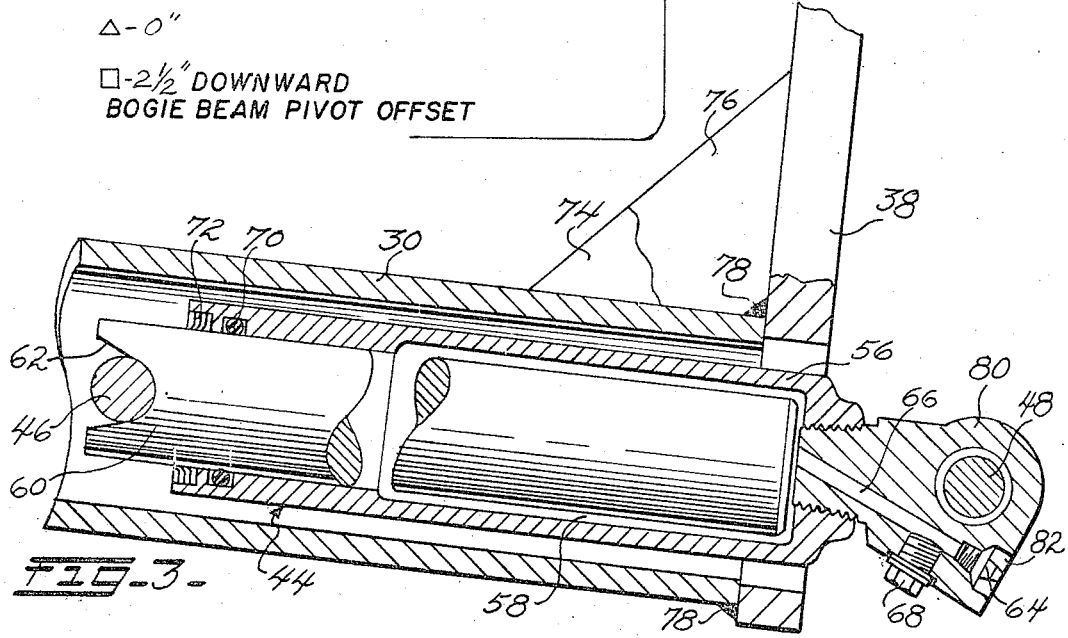

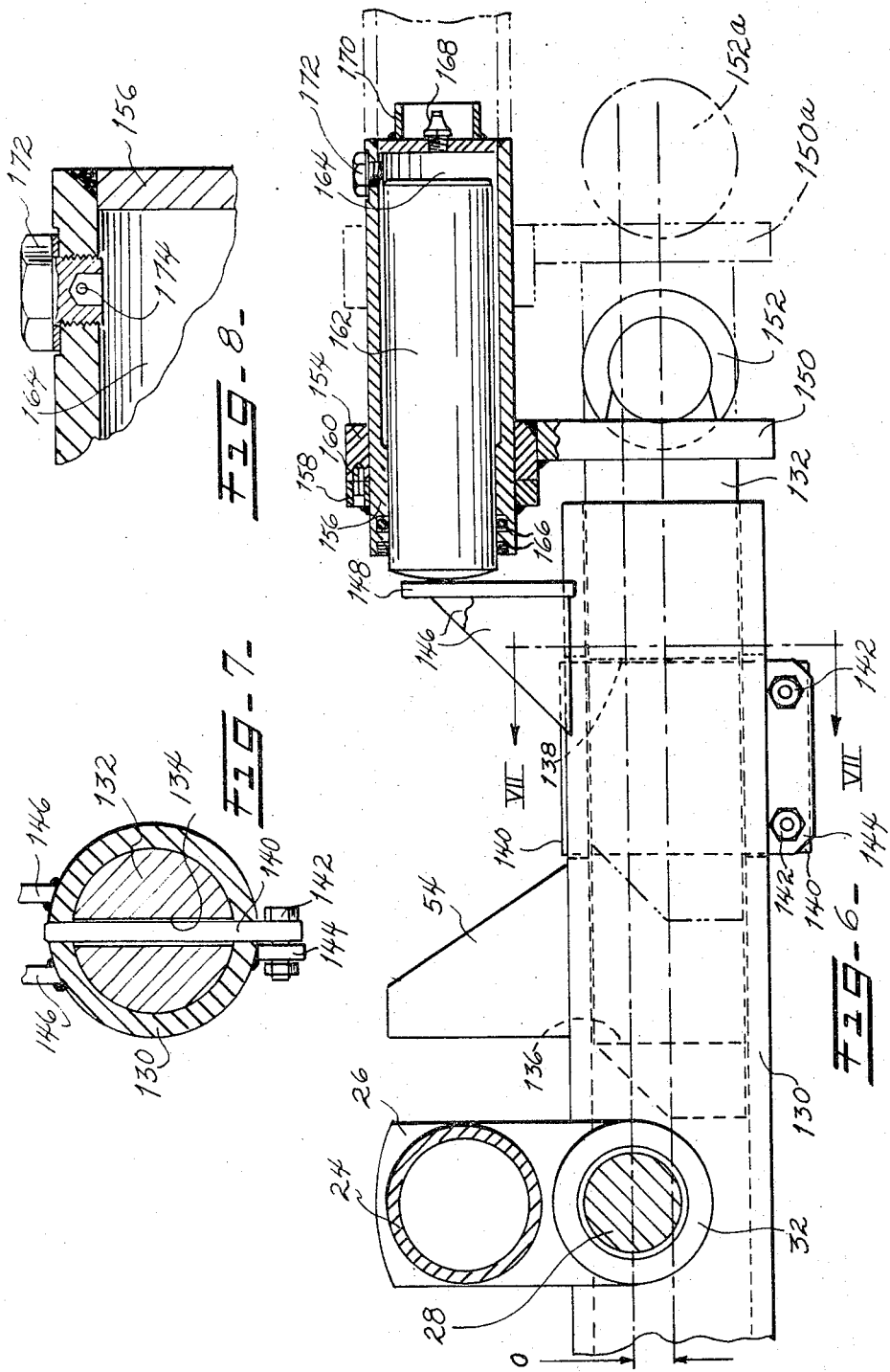

3,343,889
CRAWLER TRACTOR SUSPENSION
Eugen Bexten, Hamilton, Ontario, Canada, assignor to International Harvester Company, a corporation of Delaware
Filed Aug. 4, 1964, Ser. No. 387,300
12 Claims. (Cl. 305—10)

This application relates to crawler tractor wheel suspensions, and more particularly to a front suspension which oscillates in its action and which, in respect of the endless crawler track trained thereon, has the track under tension and keeps the track taut when the wheels are oscillating.

In rubber-tire-driven, crawler suspensions, and especially in cases where the front suspensions are mounted so as to allow a track assembly to oscillate at each side of the vehicle, the front and center wheels are particularly critical components in the effort to keep each track assembly from loosening. A combination of good track tension adjustability, and proper wheel proportions and geometry has been found greatly to improve the wheel action in maintaining uniform tension.

An object of my invention, in connection with a tractor having three pneumatic tires on each side to support the endless track at that side, is to provide an optimum geometry enabling track to remain taut while oscillating, without overtightening.

A more specific object in line with the objective just stated is to provide suspension means for the endless, metal link track at each side of a crawler vehicle, including at each side tandem road wheels consisting of small size front and center wheels, and a large rear drive wheel mounted to the vehicle on an axis of rotation; a longitudinally extending beam having inner and outer ends, and two wheel spindles fixed one at each of the ends and each rotatably connected to one of the small size wheels at that end; a transversely-extending shaft on the vehicle connected to a midportion of the beam for supporting the beam to rock the front and center wheels freely about a transverse axis of oscillation; and an endless track trained about and supported by the tandem wheels; the axis of rotation and the axis of oscillation aforesaid having a fixed, center-to-center distance apart; the axis of oscillation being offset a major fraction of an inch above a plane common to the spindles of the small size wheels so that the same track tension, effective when the small wheel spindles occupy a common horizontal plane, is substantially uniformly maintained throughout all positions of oscillation of those wheels.

Another object of my invention is to provide, in a front suspension for the endless track of a vehicle, an hydraulic means of adjustment for moving the front wheel fore-and-aft in simple and positive manner for setting and locking the track tension for the degree of tautness desired.

A more specific object, in line with the objective just stated is to provide, in a suspension means for the endless track at one side of a crawler vehicle, small front and center road wheels; a rear drive wheel of large diameter; a longitudinally-extending beam having inner and outer ends and carrying the small wheels for rotation one at each end; the front road wheel being shiftably mounted to the outer end aforesaid; a laterally-extending shaft connecting the vehicle and the beam together at a point intermediate the ends of the beam so that the beam is free to rock the small wheels about a fixed transverse axis of oscillation; and compression means operatively behind the front wheel comprising an hydraulic cylinder operably connected between the beam and the shiftably-mounted front wheel for locking it in a fore-and-aft direction, upon establishing proper tension to the track when the axes of rotation of the small wheels are contained in a common horizontal plane; the axis of oscillation being located above but substantially in the common horizontal plane in which the rotational axes of the small wheels are contained.

A further object, in line with the objective just stated, is to provide shiftable mounting means and compression means as referred to, characterized wherein the front road wheel is shiftably mounted on a swinging arm depending from an upright on the outer end of the bogie beam, and wherein such outer end is hollow, and the hydraulic cylinder telescopically fits therein in essentially a concentric relation and acts operatively in compression between a fixed pivot in the beam and the depending arm.

An additional object, in a modified form of my invention, is the provision of shiftable mounting means for the front wheel comprising an axle-carrying bar telescopically fitting in the hollow outer end of the bogie beam, and the provision of compression means comprising an hydraulic cylinder fixed to, and mounted in an upwardly offset, parallel relation to the beam, and acting operatively in compression between an upright abutment plate on the beam and the axle-carrying bar.

Further features, objects, and advantages will either be specifically pointed out or become apparent when, for a better understanding of the invention, reference is made to the following written description, taken in conjunction with the accompanying drawings which show certain preferred embodiments thereof and in which:

FIGURE 3 is an inside elevational view drawn to enlarged scale, showing a detail of and corresponding to FIGURE 2;

FIGURE 4 is an inside elevational view drawn fragmentarily and to enlarged scale, showing a detail of and corresponding to FIGURE 3;

FIGURE 5 is a graph illustrating chain slackness and tightness and having sketch and letter notations in the legend;

FIGURE 6 is a fragmentary, large scale inside elevational view corresponding to FIGURE 2 but showing a modification of the invention;

FIGURE 7 is a transverse sectional view taken along the section lines VII—VII of FIGURE 6; and FIGURE 8 is an inside elevational view drawn fragmentarily and to enlarged scale, and showing a detail of and corresponding to FIGURE 6.

Figure 1:
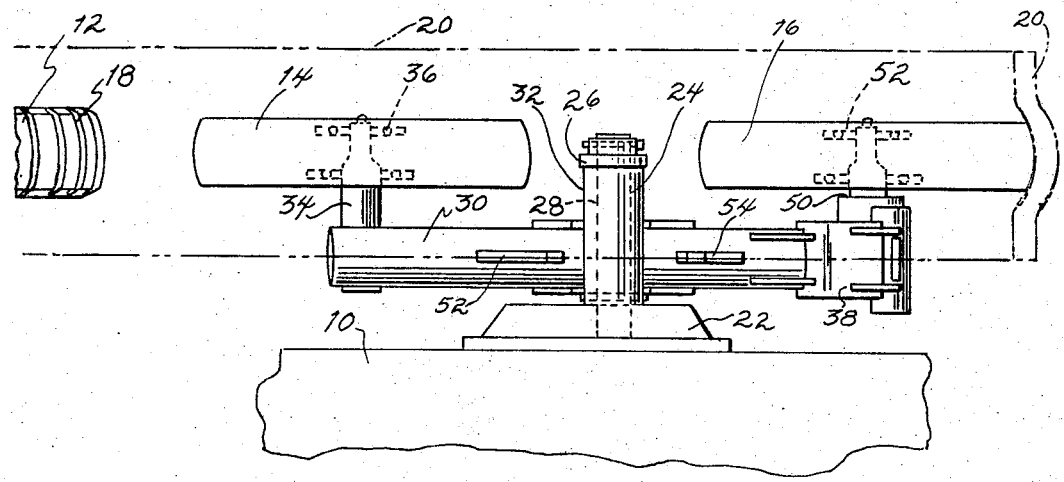
FIGURES 1 and 2 are top plan and inside elevational views of the track assembly and tandem road wheels suspending the left side of a vehicle embodying the present invention.

More particularly in FIGURE 1 of the drawings, a steered-by-driving vehicle sometimes termed a skidder is shown having a generally longitudinal frame 10 extending in the direction of running and having, along the left side of the frame, a series of three tandem road wheels 12, 14, and 16 at the rear, at the center, and at the front, respectively, of the vehicle. The rear wheel 12 is driven by the vehicle engine, not shown, and carries a pneumatic tire provided with transverse grooves 18 in the tread to engage drive bars carried by a schematically-shown metal link endless track 20.

The track 20 is trained about the three tandem wheels, of which the center and front wheels 14 and 16 carry pneumatic tires having smooth tread and functioning simply as road wheels to maintain and guide the track. The two wheels 14 and 16 are the same size, and the rear drive wheel 12 is larger in diameter. The vehicle wheelbase is roughly two times the diameter of the rear wheel 12.

The center and front wheels 14 and 16 have an unbiased oscillating action and for this purpose, the frame 10 carries a side bracket 22. A laterally-extending rigid pipe 24 is secured at its inner end to the bracket 22 and at the outer end carries a depending cantilever plate 26. In the interests of brevity, only the suspension on the left side of the vehicle is illustrated and described in detail, and it will be understood that an identical suspension is on the right side. Steering is by driving, preferably using upstanding hand control levers of conventional type which selectively brake and clutch the rear drive wheels independently.

Figure 2:
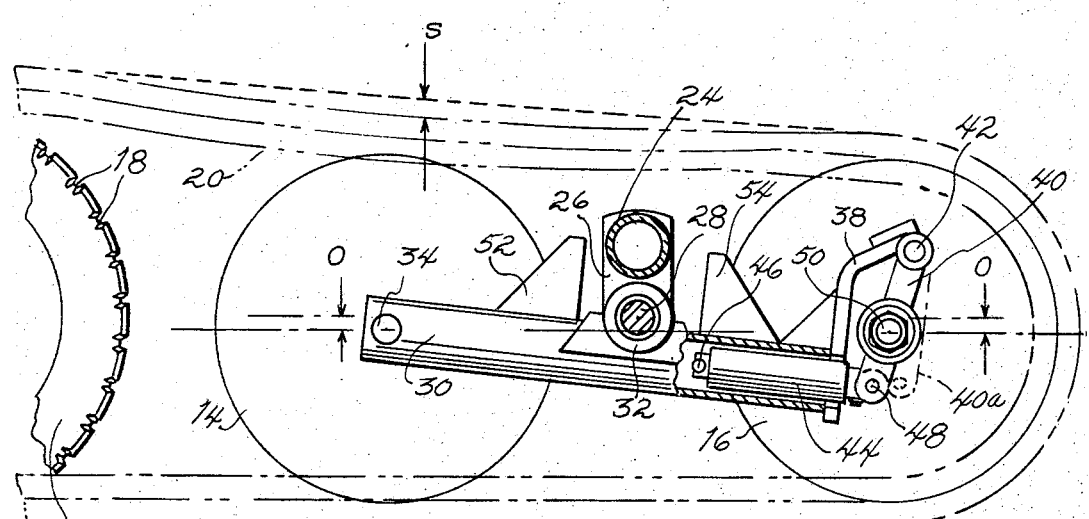

In FIGURES 1 and 2, a fixed horizontal shaft 28, which extends transversely to the direction of running, has the inner end thereof secured to the bracket 22 and has the outer end secured to the bottom portion of the cantilever plate 26. A fore-and-aft extending bogie beam 30 carries a bearing 32 which is located at the midportion thereof and which receives the shaft 28 to enable the bogie beam 30 to be unbiased and oscillate freely about a fixed horizontal axis. The inner end of the bogie beam 30 is at the rear thereof and carries a fixed wheel spindle 34 on which the center wheel 14 is rotatably mounted by means of bearings 36. The outer end of the beam 30 is at the front and carries a rigid upright 38 to which a depending suspension arm 40 is pivotally secured by means of a cross pin 42.

A hydraulic track tensioning means generally indicated at 44 is operatively in compression between a fixed transverse pivot pin 46 within the beam 30 and an arm pivot pin 48 carried by the lower end of the suspension arm 40. The arm 40 at its free swinging midportion carries a fixed spindle 50 and moves into various positions such as the dotted line position 40a to adjust the spindle 50 fore-and-aft.

The spindle 50 is received in bearings 52 within the hub of the wheel 16 and, in response to the tensioning means 44, the wheel 16 takes adjustably locked positions to change tightness in the track 20.

In the operative condition of the suspension illustrated in FIGURE 2, the axes of the wheel spindles 34 and 50 are on one level, whereas the axis of the shaft 28 is displaced vertically upwardly by an offset distance O from the common horizontal plane containing the axes of the spindles. Under conditions of a properly selected value of the offset O, the front wheel 16 may go downwardly without introducing slack into the track 20, and downward motion is limited by an upstanding gusset plate 52 which is carried by the beam 30. In one physically constructed embodiment of the invention, the gusset plate 52 allowed the beam, from the position shown, to oscillate clockwise as viewed in FIGURE 2 to a point at which the upper and lower flights of the track at the front end sloped diagonally down from the horizontal at an angle of 17°, and at that point the plate 52 engaged the rigid pipe 24 to provide a solid stop. An upstanding gusset plate 54 secured to the beam 30 forwardly of the rigid pipe 24 engaged the pipe in that physically constructed embodiment of the invention so as to stop oscillation when the beam had rotated counterclockwise from the position illustrated in FIGURE 2, to a point at which the upper and lower flights of the track at the front end inclined diagonally up from the horizontal at an angle of 18°.

In FIGURE 3, the hydraulic tensioning means 44 comprises a single-acting cylinder 56 which fits in the hollow outer end of the beam 30 with all around clearance so as to be capable of slight vertical movement therein about the fixed pivot pin 46 as a center. A working chamber 58 within the cylinder 56 slidably receives a rod-shaped ram 60 having a V-shaped notch 62 at the rear end which straddles the fixed pivot pin 46.

Fluid such as hydraulic liquid, oil, or grease is forced into the cylinder 56 through a one-way, zerk valve fitting 64 communicating with a passage 66. A drain plug 68 likewise communicates with the passage 66, which passage leads into the chamber 58. The ram 60 extends through a pair of tandem ring seals 70 and 72 at the rear end of the cylinder and the cylinder 56 moves forwardly relative to the ram when fluid is introduced into the passage 66. Conversely, the cylinder 56 retracts when the drain plug 68 is opened to afford escape of the fluid. A pair of gusset plates 74 and 76 rigidly reinforces the upright 38, which upright is secured to the front end of the beam 30 by means of a circular weld 78.

The passage 66 is included in an eye fitting 80 which receives the arm pivot pin 48 described in connection with FIGURE 2. The eye fitting is recessed at 82 in the vicinity of the zerk valve fitting 64 so as to provide a protective shroud.

In connection with a copending application of mine Ser. No. 387,352 filed Aug. 4, 1964, now Patent No. 3,275,386, the disclosure therein relating to the bogie beam suspension, hydraulic tensioning means, and other common matter embodied in the skidder vehicle is incorporated in this application by reference.

In FIGURE 4, the drain plug 68 has a hollow inner end portion threaded into the eye fitting 80 and is formed with a side port 84 which extends transversely to the threaded portion and through the threads. When in place, the plug 68 hydraulically locks the cylinder 56. The plug is not removed completely in order to vent or drain the passage 66 and, when it occupies the dotted line position shown by the dotted lines 68a, the plug 68 allows the port 84 to communicate with the atmosphere by degrees so as to progressively or rapidly open the working chamber 58.

On the basis of FIGURE 5 now to be explained, it will be appreciated that the vertical location of the bogie beam shaft 28 is fairly critical in respect of keeping the track tension maintained while the bogie beam 30 oscillates the track assembly. In practice the tensioning means is extended until the slack in the track 20 reaches the desired (maximum) slack value, the measurement of which can be designated S (see FIGURE 2). This condition is shown to smaller scale in the center view of FIGURE 5, in which the steered-by-driving skidder hereof is indicated at 86. Among the various upward and downward offset values of the shaft 28 as shown in accordance with the graphical representation in FIGURE 5, the solid line curve 90 represents ¾" upward offset for the value O, which is found to be the optimum setting. When the chain flights referred to slope down 15° to the horizontal due to the front wheel going downwardly as illustrated at the left in FIGURE 5, the track 20 changes only a minor amount in tension, namely it tightens about ¾". When the beam rotates the other way so that the chain flights at the front incline up to 18° to the horizontal due to the front wheel taking the maximum upwardly deflected position as indicated at the right in FIGURE 5, the track changes a lesser amount in tension, namely it tightens by approximately ½".

The least desirable arrangement to accommodate the 15° slope and the 18° incline is indicated by the dotted line curve 92 representing the result of a 2½" downward offset. The track tightens more than one inch when the front wheel 16 is down and slackens by more than one inch when the front wheel is up. The observed consequence is that the drive wheel 12 slips at times and fails to drive the track.

An upward offset O of 1¾" creates the situation represented by the curve 94. Under the condition of 15° slope and the condition of 18° incline, respectively, the track tightens approximately ³⁄₁₀" when the front wheel 16 is down and excessively tightens by more than 1" when the front wheel 16 is up, as shown at the right in FIGURE 5.

A zero offset O produces the effect diagrammed by the curve 96, wherein the track tension tightens by greater than one inch when the front wheel 16 is down, but remains fairly constant when the front wheel is level or up. These offsets are varied on a draftsman's layout for study and design purposes, whereas in actual physical structures the changes in offsets are made by vertically varying the location at which the beam bearing 32 is welded to the midportion of the bogie beam 30.

In connection with the modification shown in FIGURES 6, 7 and 8, the pipe 24, the cantilever plate 26, the cross shaft 28, the beam bearing 32, and beam gusset plate 54 appearing in FIGURE 6 are the same as in the preceding embodiment. Moreover, the upward offset O of the axis of the shaft 28 with respect to the horizontal plane containing spindle axes of the small wheels is the same as in the preceding embodiment.

In regard to the differences, the bogie beam comprises a main section 130 and a front section 132 which is telescopically received within the main section. The front section, as seen in FIGURES 6 and 7, comprises a bar having a vertical slot 134 therein which terminates on a vertical line 136 at the rear of the front section and which terminates on a line 138 at the forward end of the front section. A key plate 140 which is received in the slot 134 prevents the front section 132 from rotating but allows fore-and-aft adjustment of the front section. The lower end of the key plate 140 is secured by bolts 142 to an attachment flange 144 which is welded to the bottom of the main section 130 of the bogie beam. A pair of spaced apart gusset plates 146 reinforces a transverse abutment plate 148 which is welded to the top of the main section 130.

At the forward end referred to, the front section 132 carires a transverse plate 150 to which there is secured a front wheel spindle 152. The plate 150 is at its upper end has welded thereto a circular collar 154 for receiving an hydraulic track tensioning means.

The track tensioning means comprises a cylinder 156 to which a stop ring 158 is welded around the outside of the cylinder. A dowel 160 registering in appropriate openings prevents relative rotation between the ring 158 and the collar 154 and the stop ring prevents the cylinder 156 from moving forwardly with respect to the collar 154. A ram 162 within the working chamber 164 of the cylinder projects rearwardly through a pair of tandem ring seals 166 into engagement with the abutment plate 148.

At the front end of the cylinder 156, appropriate fluid is introduced into the working chamber 164 by means of a one-way zerk valve fitting 168 which is recessed within a protective shroud 170 carried at the front end of the cylinder 156. A drain plug 172 is mounted on top of the cylinder so as to vent air from the chamber 164 and also to release pressure in the chamber 164 when the cylinder retracts. The drain plug 172 fits in threads for effecting fine adjustment and has a side port 174, seen in FIGURE 8, providing a ready means of draining fluid or venting air at a controllable rate and without removing the plug 172 completely from the cylinder. The side port construction is of particular value to prevent sudden slackening of the track and dangerous movement of the machine parts against the operator when he is removing a track assembly.

The cylinder 156 is readily removed from the bogie beam by disconnecting the track, not shown, then removing the key plate 140, next withdrawing the front section 132 forwardly, and finally withdrawing the cylinder 156 rearwardly from the collar 154 so as to remove it from the front section 132.

In FIGURE 6, chain tension is increased by introducing fluid into the chamber 164, thereby forcing the transverse plate 150 and the front wheel spindle 152 into extended positions such as the respective positions indicated by the dotted lines 150a and 152a. Partial unscrewing of the drain plug 172 for a few turns allows the fluid to escape gradually through the port 174 from the chamber 164 so that the transverse plate 150 and the spindle 152 can resume their solid line positions as shown by the solid lines in FIGURE 6.

Following is an example of specifications and dimensions for the vehicle suspension illustrated.

Wheel diameters:
- Wheel 16 at the front _____ 28″
- Wheel 14 at the center _____ 28″
- Wheel 12 at the rear _____ 34″
- Ratio diameter wheel 12 to small wheels 14 and 16 _____ 1.2:1
- Upward offset O (optimum) of axis of shaft 28 _____ ¾″
- Offset O (optimum) to small wheel diameter, in percentage approximately _____ 3%
- Slack as measured between straight edge on track and upper flight of track _____ ⅞″
- Gage (center to center distance between tracks) _____ 52″

Wheel base:
- Retracted _____ 66.7″
- Extended _____ 71.7″
- Center to center distance between rear wheel 12 and center wheel 14 _____ _____ 32.7″

From the foregoing it is apparent that a freely oscillating, track carrying suspension can, with appropriate optimum geometry, maintain the track assembly taut in all positions of oscillation, without overtightening the track. Fixed geometry is an important requisite to this end, necessitating a fixed axis for the wheel at the rear of the vehicle, a fixed axis for the bogie beam shaft 28, and means fixing the wheel spindles of the wheel at the center and the wheel at the front with respect to the bogie beam. Thus there is no mechanical elasticity allowing shifting of these axes under bending forces due to uneven terrain, and a stable predictable suspension results.

Variations within the spirit and the scope of the invention described are equally comprehended by the foregoing description.

What is claimed is:

1. Suspension means including a wheel-supported endless track chain at a side of a crawler vehicle, and further including:
   small wheels at the front and center, respectively, of the vehicle;
   a large rear drive wheel rotatably mounted to the vehicle at the rear end on a fixed axis, the location and proportions of said wheels being such that the wheelbase is approximately in the range of 66 to 72 inches and the ratio of the diameters of the large and small wheels is 1.2:1;
   a longitudinally extending beam having inner and outer ends, and an upstanding arm member rigid with the outer end, said beam further having two wheel spindles carried one at each end and each rotatably connected to a small wheel at that end, said upstanding arm member having an upstanding end, and a locked, spindle carrying suspension arm depending from, and secured to, the upstanding end of the arm member and rigidly carrying that spindle which is connected to the small front wheel; and
   a transversely extending shaft on said vehicle freely journalled to substantially the midpoint of the beam for supporting the beam to rock unbiased about a fixed transverse axis of oscillation, said beam being otherwise unconnected to the vehicle;
   said fixed axis of oscillation being approximately ¾ of an inch upwardly offset from the common plane of the spindles of the small wheels.

2. Suspension means including a wheel-supported endless, metal-link track at a side of a steered-by-driving vehicle, and further including:
   tandem road wheels comprising small size wheels at the front and center, respectively, of the steered-by-driving vehicle; and
   a large rear drive wheel rotatably mounted to the vehicle on a first axis, the location and proportions of the tandem wheels being such that the ratio of the vehicle wheelbase to the diameter of the large wheel is approximately 2:1 and the ratio of the large to the small wheels is approximately 1.2:1;

a longitudinally extending beam having inner and outer ends, and having two wheel spindles fixed one at each of the ends and each rotatably connected to one of the small size wheels at that end; and a transversely extending shaft on said vehicle freely journalled to the mid-portion of the beam, for supporting the beam to oscillate unbiased about a second axis;

said first and second axes having a fixed center to center distance apart, said second axis being offset approximately ¾ of an inch above a plane common to the spindles of the small size wheels.

3. Suspension means including a wheel-supported endless, metal-link track at a side of a steered-by-driving vehicle, and further including:

three tandem road wheels consisting of small size wheels at the front and center, respectively, of said steered-by-driving vehicle; and a large rear drive wheel mounted to the vehicle on a transverse axis of rotation, the location and proportions of the wheels being such that the ratio of the wheelbase to the diameter of the large wheel is approximately 2:1 and the ratio of the diameters of the large to the small wheels is approximately 1.2:1;

a longitudinally extending beam having inner and outer ends, and an upstanding arm member rigid with the outer end, said beam further having two wheel spindles carried one at each of the ends and each rotatably connected to one of the small size wheels at that end, and a locked, spindle carrying suspension arm depending from, and secured to, the upstanding end of the arm member and rigidly carrying that spindle which is connected to the front small size wheel;

and a laterally extending shaft on said vehicle connected to the mid-portion of the beam, for supporting the beam to rock the front and center wheels freely about a transverse axis of oscillation;

said axis of rotation and said axis of oscillation having a fixed, center to center distance apart, said axis of oscillation being offset about ¾ of an inch above a plane common to the spindles of the small size wheels so that the same track tension, effective when the small wheel spindles occupy a common horizontal plane, is substantially uniformly maintained throughout the positions of oscillation of those wheels.

4. Suspension means for an endless track chain at a side of a crawler vehicle including:

small front and center road wheels;

a rear drive wheel of large diameter;

a longitudinally extending beam having inner and outer ends and carrying the small wheels for rotation one at each end;

a laterally extending shaft connecting the vehicle and the beam together at substantially a midpoint of the beam so that the beam is free to rock the small wheels about a fixed transverse axis of oscillation;

said wheels having a location and proportions such that the vehicle wheelbase is approximately in the range of 66 to 72 inches and the ratio of the large to the small wheels is approximately 1.2:1;

said beam comprising, at the front, a front end section to which the front wheel is rotatably connected, and a main section with which the front end section is telescopically interfitted;

compression means operatively behind the front wheel, comprising an hydraulic cylinder parallel to and in the plane of the main and end sections of the beam, and disposed in an offset location on said beam, said hydraulic cylinder being connected between said sections for adjustably locking the front end section in a fore and aft direction, upon establishing proper tension to the track when the axes of rotation of the small wheels are contained in a common horizontal plane; and locking means establishing communication with the fluid inside said cylinder for hydraulically locking same in an extensibly or retractively moved position;

said axis of oscillation being approximately ¾ of an inch upwardly offset from the common horizontal plane in which the rotational axes of the small wheels are contained, so that the track tension which is established is thereafter maintained substantially uniform throughout the positions of oscillation of the small wheels.

5. Suspension means for the endless, metal-link track at a side of a crawler vehicle including:

small front and center road wheels;

a rear road drive wheel of large diameter mounted to the vehicle for turning on a transverse axis of rotation, said wheels providing a vehicle wheelbase measuring approximately two times said large diameter;

a longitudinally extending beam having inner and outer ends and carrying the small wheels one at each end;

a laterally extending shaft connecting the vehicle and the beam together at substantially the midpoint of the beam so as to establish a transverse axis of oscillation of the beam for swinging the wheels up and down;

said beam comprising, at the front end, a front end section to which the front wheel is rotatably connected, and a main section with which the front section is telescopically interfitted;

compression means operatively behind the front wheel comprising an hydraulic cylinder parallel to and in the plane of the main and end sections of the beam, and disposed in an upwardly offset location on said beam and connected between said sections for adjustably locking the front end section in a fore and aft direction to apply the desired tension to the track when the axes of rotation of the small wheels occupy a common, horizontal reference plane; and locking means communicating with the fluid inside said cylinder for hydraulically locking same in an extensibly or retractively moved position thereof;

said transverse axis of rotation and said transverse axis of oscillation being each fixed to have a fixed center to center distance, said axis of oscillation being offset approximately ¾ of an inch above the reference plane aforesaid so that the applied tension desired is maintained substantially uniform throughout the positions to which the small wheels are swung due to oscillation of the beam.

6. In a steered-by-driving vehicle including an endless track at a side thereof, suspension means for that side including:

small front and center road wheels;

a rear drive wheel of large diameter;

a longitudinally extending beam having inner and outer ends and carrying the small wheels for rotation one at each end;

a laterally extending shaft connecting the vehicle and the beam together substantially at a midpoint of the beam so that the beam is free to rock the small wheels about a fixed transverse axis of oscillation;

said wheels having a location and proportions such that the vehicle wheelbase relative to the rear drive wheel is approximately 200% of its diameter and the rear wheel has a diameter approximately 120% of the diameter of the small wheels;

said beam comprising, at the front, a front end section to which the front wheel is rotatably connected, and a main section with which the front end section is telescopically interfitted;

compression means operatively behind the front wheel, comprising an hydraulic cylinder parallel to and in plane of the main and end sections of the beam, and disposed in an offset location on said beam, said hydraulic cylinder being connected between said sections for adjustably locking the front end section in a fore-and-aft direction, upon establishing proper tension to the track when the axes of rotation of the small wheels are contained in a common horizontal plane; and locking means establishing communication with the fluid inside the cylinder for hydraulically locking same in an extensibly or retractively moved position;

said axis of oscillation having an upward offset of substantially 3% of the diameter of the small diameter wheels, with respect to said common horizontal plane in which the axes of rotation of the small wheels are contained.

7. The invention according to claim 5, wherein the ratio of diameters between the large wheel and each of the small wheels is approximately 1.2:1.

8. The invention according to claim 5, wherein the small diameter front and center wheels each have a diameter of approximately 28 inches, and the rear road drive wheel has a diameter of approximately 34 inches.

9. Suspension means for the endless track at a side of a crawler vehicle including, in combination with the track:

tandem wheels about which the track is trained consisting of small diameter front and center wheels;

a rear drive wheel of large diameter;

a longitudinally extending beam having front and rear ends and carrying the small wheels one at each end, the front end including an enclosed hollow portion and having an upright affixed thereon;

an arm which is secured to the upright on said hollow front end of the beam so as to depend from and swing about a secured end portion of the arm from a transverse axis fixed above the beam proper and having an opposite free end, said front wheel being rotatably connected to an intermediate portion of the depending arm;

a laterally extending shaft connecting the vehicle and the beam together at substantially the midpoint of the beam so as to establish a fixed transverse axis of oscillation of the beam;

compression means operatively behind the front wheel comprising an hydraulic cylinder substantially concentric to the hollow front end of the beam, and disposed therewithin and connected between the beam at one end and to the arm at said free end portion for applying tension to the track; and relief valve means communicating with the fluid inside said cylinder for controlling same in an extensibly or retractively moved position;

said axis of oscillation being so located that substantially uniform track tension is maintained throughout the positions of oscillation of the small wheels.

10. The invention according to claim 9, wherein the ratio of diameters between the large wheel and each of the small wheels is approximately 1.2:1;

said axis of oscillation having an upward offset relative to said reference plane of substantially 3% of the diameter of the small wheels.

11. The invention according to claim 2, wherein the small size front and center wheels each have a diameter of approximately 28 inches, and the large rear drive wheel has a diameter of approximately 34 inches.

12. In a crawler vehicle including an endless track chain at a side thereof, suspension means for that side of the vehicle including:

tandem road wheels comprising small wheels at the front and center, respectively of the vehicle; and a large rear drive wheel rotatably mounted to the vehicle on a first axis;

a longitudinally extending beam having inner and outer ends, and having two wheel spindles carried one at each of the ends and each rotatably connected to one of the small wheels at that end; and a transversely extending shaft on said vehicle freely journaled to the midportion of the beam, for supporting the beam to oscillate unbiased about a second axis, said axes and wheels having proportions and locations effectively providing:

an upward offset of the second axis relative to the plane common to the spindles of the small wheels which is approximately 3% of the small wheel diameter;

a large wheel diameter which is approximately 120% of the small wheel diameter; and a wheelbase which is approximately 200% of the large wheel diameter.

References Cited

UNITED STATES PATENTS

| | | |
|---|---|---|
| 2,423,544 | 7/1947 | Acton. |
| 2,654,639 | 10/1953 | Bombardier _____ 305—10 |
| 2,828,170 | 3/1958 | Badgley _____ 305—10 X |
| 2,891,821 | 6/1959 | Mayr _____ 305—32 X |
| 3,142,352 | 7/1964 | Johansson. |
| 3,190,384 | 6/1965 | Dufresne _____ 180—6.7 |

FOREIGN PATENTS 1,158,379  11/1963  Germany.

BENJAMIN HERSH, *Primary Examiner.*

MILTON BUCHLER, *Examiner.*

R. J. JOHNSON, *Assistant Examiner.*